(12) United States Patent
Ono

(10) Patent No.: US 9,182,003 B2
(45) Date of Patent: Nov. 10, 2015

(54) DAMPER DEVICE

(75) Inventor: Takashi Ono, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 25 days.

(21) Appl. No.: 13/978,817

(22) PCT Filed: Jan. 6, 2012

(86) PCT No.: PCT/JP2012/050197
§ 371 (c)(1),
(2), (4) Date: Aug. 5, 2013

(87) PCT Pub. No.: WO2012/096235
PCT Pub. Date: Jul. 19, 2012

(65) Prior Publication Data
US 2013/0306417 A1    Nov. 21, 2013

(30) Foreign Application Priority Data

Jan. 11, 2011 (JP) ................................. 2011-003077

(51) Int. Cl.
| | | |
|---|---|---|
| *F16F 9/10* | (2006.01) | |
| *F16F 9/12* | (2006.01) | |
| *F16J 15/18* | (2006.01) | |

(52) U.S. Cl.
CPC ... *F16F 9/12* (2013.01); *F16J 15/18* (2013.01)

(58) Field of Classification Search
CPC ........... F16F 9/12; F16F 9/145; F16F 9/3242; F16F 9/3271; B60N 3/023
USPC ...................................... 188/290, 306; 16/57
See application file for complete search history.

(56) References Cited

U.S. PATENT DOCUMENTS

| | | | | |
|---|---|---|---|---|
| 5,497,863 | A   * | 3/1996 | Schmidt et al. ............... | 188/306 |
| 6,561,323 | B2 * | 5/2003 | Machida ....................... | 188/293 |
| 6,662,683 | B1 | 12/2003 | Takahashi et al. | |
| 7,753,181 | B2 * | 7/2010 | Doornbos ...................... | 188/290 |
| 2002/0158383 | A1 | 10/2002 | Nakabayashi | |
| 2004/0103746 | A1* | 6/2004 | Anton et al. .................... | 74/574 |
| 2010/0282553 | A1* | 11/2010 | Cultraro ......................... | 188/290 |
| 2011/0139558 | A1* | 6/2011 | Cultraro .................... | 188/322.15 |

FOREIGN PATENT DOCUMENTS

| | | | |
|---|---|---|---|
| CN | 2725624 Y | 9/2005 | |
| DE | 29604260 U1 * | 4/1996 | .............. B60N 3/02 |
| JP | H10-115337 A | 5/1998 | |
| WO | 01/10672 A1 | 2/2001 | |
| WO | 2007/102111 A2 | 9/2007 | |

OTHER PUBLICATIONS

China Patent Office, "Office Action for CN 201280005096.X," Sep. 3, 2014.

* cited by examiner

*Primary Examiner* — Bradley King
*Assistant Examiner* — Stephen Bowes
(74) *Attorney, Agent, or Firm* — Manabu Kanesaka

(57) ABSTRACT

A damper device includes an inner part having a cylindrical shape; an outer part including an annular space with a bottom to rotatably or relatively rotatably house the inner part from one cylinder end side; and a viscous fluid filled in the annular space. An outer side of the inner part is formed with a circular groove to fit an outside seal ring. Also, an inner side of the inner part is formed with a circular step surface positioned closer to the one cylinder end side than the circular groove, and positioning an inside seal ring. A depth of the circular groove has a dimension approximately half a thickness of the inner part at a portion forming the circular groove.

2 Claims, 6 Drawing Sheets

DAMPER DEVICE

FIELD OF TECHNOLOGY

The present invention relates to an improvement of a damper device comprising an inner part; an outer part allowing a rotation or a relative rotation of the inner part, and combined with the inner part; and a viscous fluid providing a resistance to the rotation or the relative rotation.

BACKGROUND ART

As for a damper wherein relative to a case having an annular space, a cylindrical rotor is rotatably housed in the annular space, and a resistance to a rotation of the rotor is provided by the viscous fluid filled in the annular space, there are dampers shown in Patent Document 1 and Patent Document 2.

However, in the damper in the Patent Document 1, an O-ring which seals between an outer side of the rotor and the case, and an O-ring which seals between an inner side of the rotor and the case are positioned to overlap on an imaginary line segment perpendicular to a center axis of the rotation of the rotor to cause difficulty in minimizing an external diameter of the damper.

On the other hand, in the damper in the Patent Document 2, in order to hold the O-ring sealing between the outer side of the rotor and the case, there is required a cap. Also, a seal portion by the O-ring in the rotor does not have a structure allowing the external diameter of the damper to be minimized.

PRIOR ART DOCUMENTS

Patent Documents

Patent Document 1:International Publication No. 2007/102111
Patent Document 2:Japanese Unexamined Patent Application Publication No. 2003-506256

DISCLOSURE OF THE INVENTION

Problems to be Solved by the Invention

A main object to be obtained by the present invention is to provide a function, effectively preventing a leakage of the viscous fluid filled while an external diameter thereof is being minimized without increasing the number of components or complicating a structure, to this kind of damper device.

Means for Solving the Problems

In order to obtain the aforementioned object, the present invention provides a damper device comprising an inner part having a cylindrical shape and including an attachment portion relative to one object; an outer part having an outside circular wall, an inside circular wall, and a bottom wall, and including an annular space with a bottom defined by the walls, to rotatably or relatively rotatably house the inner part from one cylinder end side thereof through an introduction opening opposite to a bottom wall side, and an attachment portion relative to the other object;
and a viscous fluid filled in the annular space, and providing a resistance to a rotation or a relative rotation of the inner part associated with a movement or a relative movement of the one object. An outer side of the inner part is formed with a circular groove to fit an outside seal ring. Also, an inner side of the inner part is formed with a circular step surface positioned closer to the one cylinder end side than the circular groove, and positioning an inside seal ring. Furthermore, a depth of the circular groove has a dimension approximately half of a thickness of the inner part at a formation portion of the circular groove.

According to such configuration, when the inner part is housed and combined in the annular space from a state wherein the outside seal ring is fitted in the circular groove of the inner part; the inside seal ring is housed inside the inner part; and the viscous fluid is filled in the annular space of the outer part, an air inside the annular space can be deaired from between an outer surface of the inner part and the outside circular wall until the inside seal ring seals between an inner surface of the inner part and the inside circular wall, and the outside seal ring seals between the outer surface of the inner part and the outside circular wall. Also, at the time of assembly, a leakage to an outside of the viscous fluid, especially, a leakage from between the inner surface of the inner part and the inside circular wall can be effectively prevented. Also, in a center axis direction of the rotation or the relative rotation of the inner part, a position forming the circular groove and a position forming the circular step surface are out of alignment. Furthermore, since the depth of the circular groove has the dimension approximately half of the thickness of the inner part at the formation portion of the circular groove, an external diameter of the damper device at a seal portion between the inner part and the outer part can be minimized.

In a direction along a center axis of the rotation or the relative rotation of the inner part, provided that a distance between the circular groove and the circular step surface is approximately equal to a width of the outside seal ring or the inside seal ring, a dimension of the damper device in the center axis direction can be also minimized.

Also, provided that an inner cylinder portion forming the inside circular wall of the outer part has a length to position the inside circular wall on an inward side of the circular groove of the inner part, the inside circular wall of the outer part supports the inner part in a wide range in the center axis direction of the rotation. Accordingly, the inner part can be rotated or relatively rotated around the center axis with little wobbling. Also, the outside seal ring solidly fitted in the circular groove is clamped between the inside circular wall and the outside circular wall so as to further stabilize a seal state by the outside seal ring.

Also, provided that the other cylinder end side of the inner part is formed with an engaging portion which is engaged with an engaged portion formed on an introduction opening side in the outside circular wall of the outer part in a position wherein the inner part is completely entered in the annular space of the outer part, and that the inner cylinder portion. forming the inside circular wall of the outer part has a length to position the inside circular wall on an inward side of the engaging portion of the inner part, the inner cylinder portion can create a state wherein an engagement between the engaging portion and the engaged portion is further difficult to be solved.

Also, provided that the other cylinder end side of the inner part is formed with an abutting portion which bumps into a cylinder end of the inner cylinder portion forming the inside circular wall of the outer part in the position wherein the inner part is completely entered inside the annular space of the outer part, only by simply combining the inner part and the outer part, a combined state thereof can be carried out as designed.

Effect of the Invention

According to the present invention, the damper device can provide a function effectively preventing the leakage of the viscous fluid filled while the external diameter thereof is being minimized.

BEST MODES OF CARRYING OUT THE INVENTION

Figure 1:
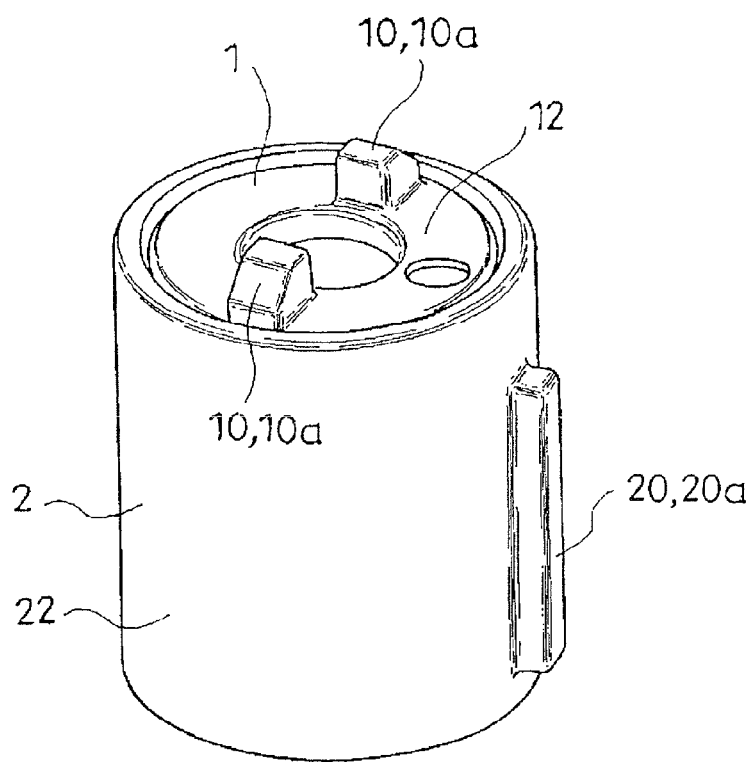
FIG. 1 is a perspective view of a damper device according to one embodiment of the present invention.
Figure 2:
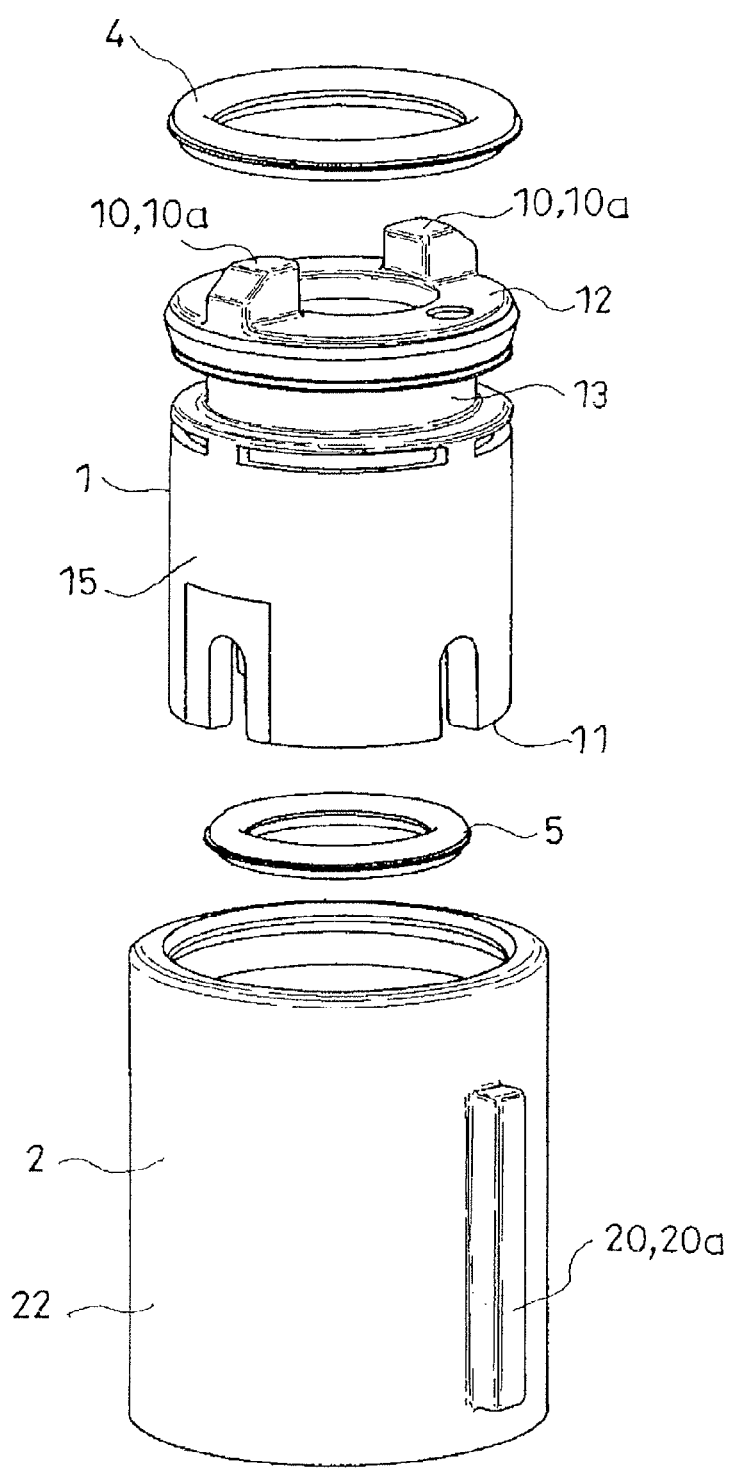
FIG. 2 is an exploded perspective view of the damper device in FIG. 1.
Figure 3:
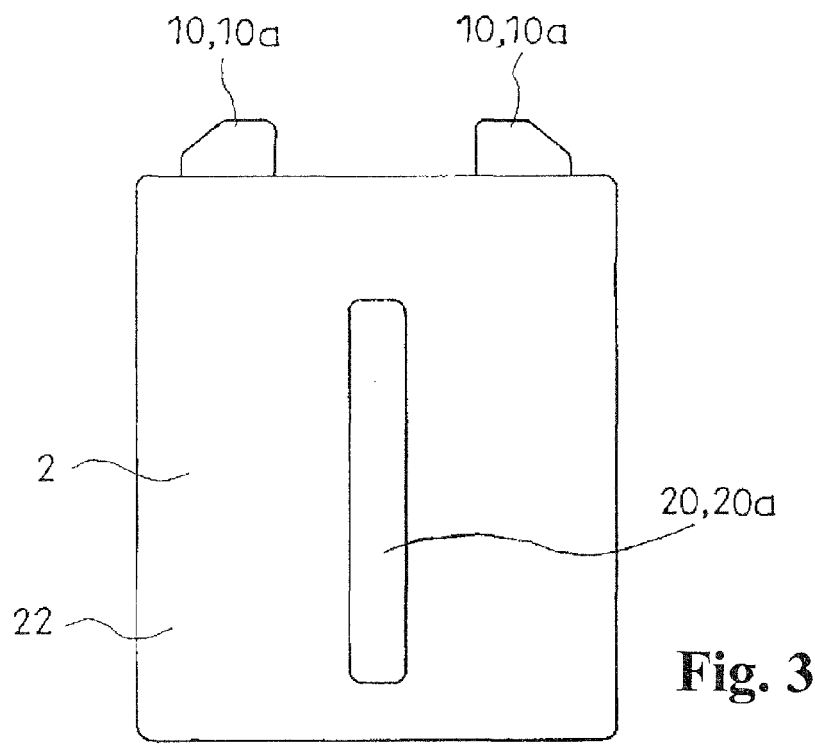
FIG. 3 is a side view of the damper device in FIG. 1.
Figure 4:
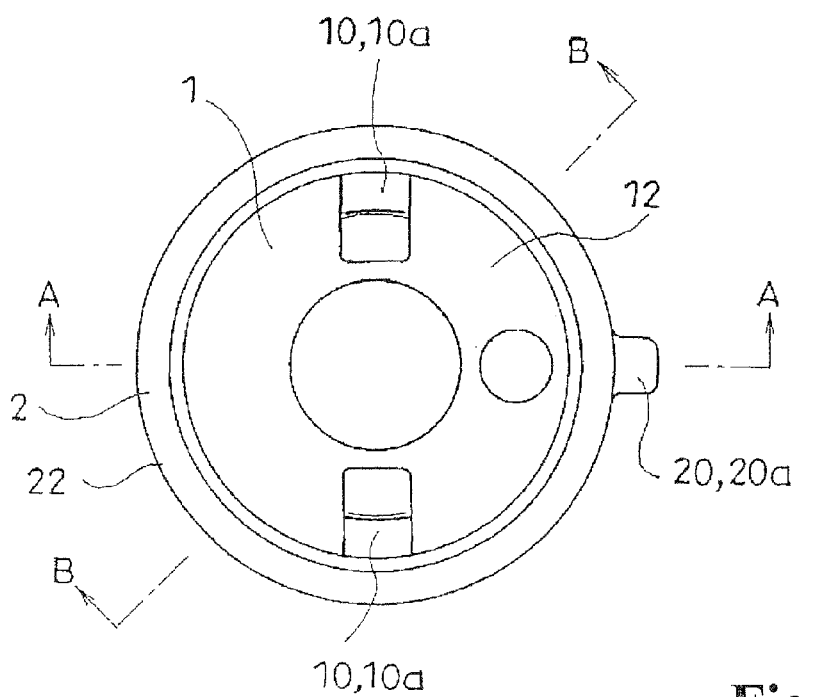
FIG. 4 is a plan view of the damper device in FIG. 1.
Figure 5:
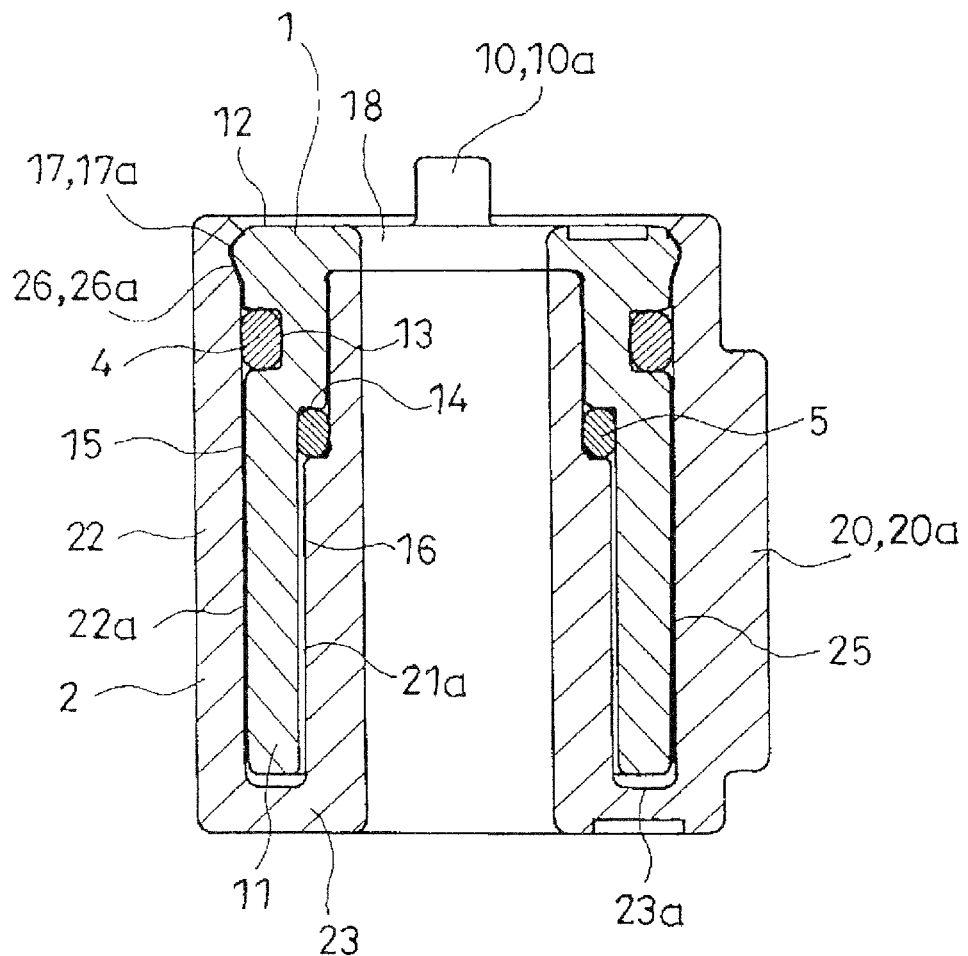
FIG. 5 is a cross-sectional view taken along a line A-A in FIG. 4.
Figure 6:
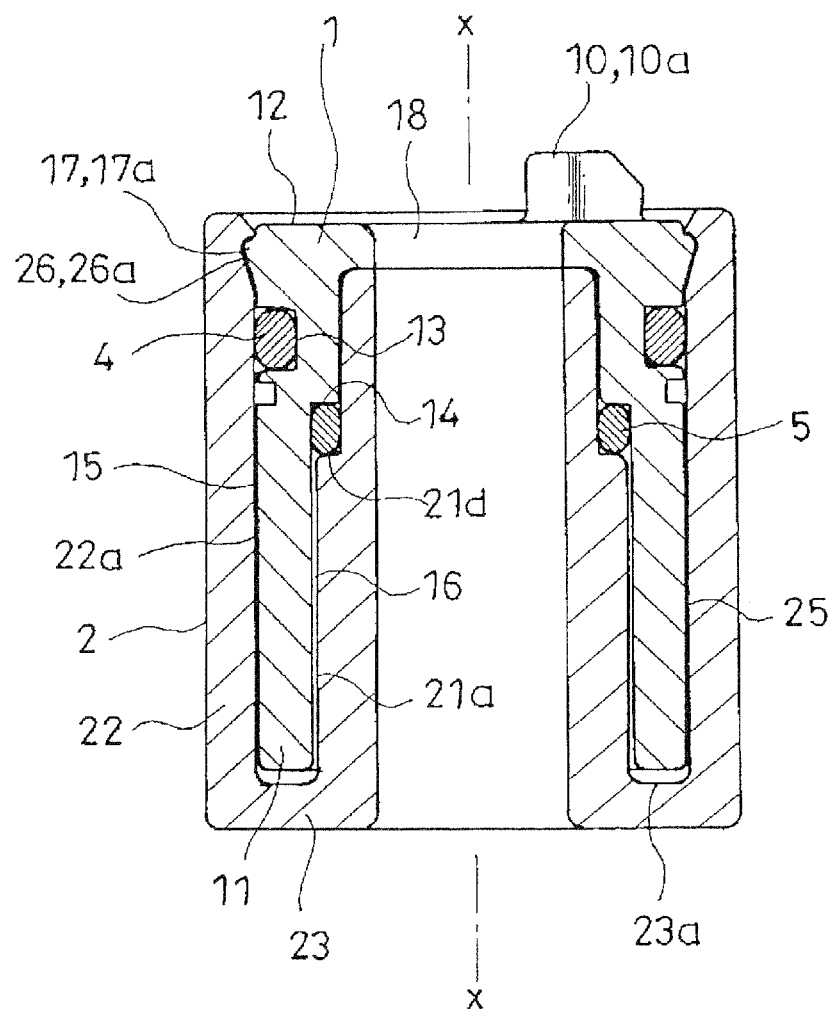
FIG. 6 is a cross-sectional view taken along a line B-B in FIG. 4.
Figure 7:
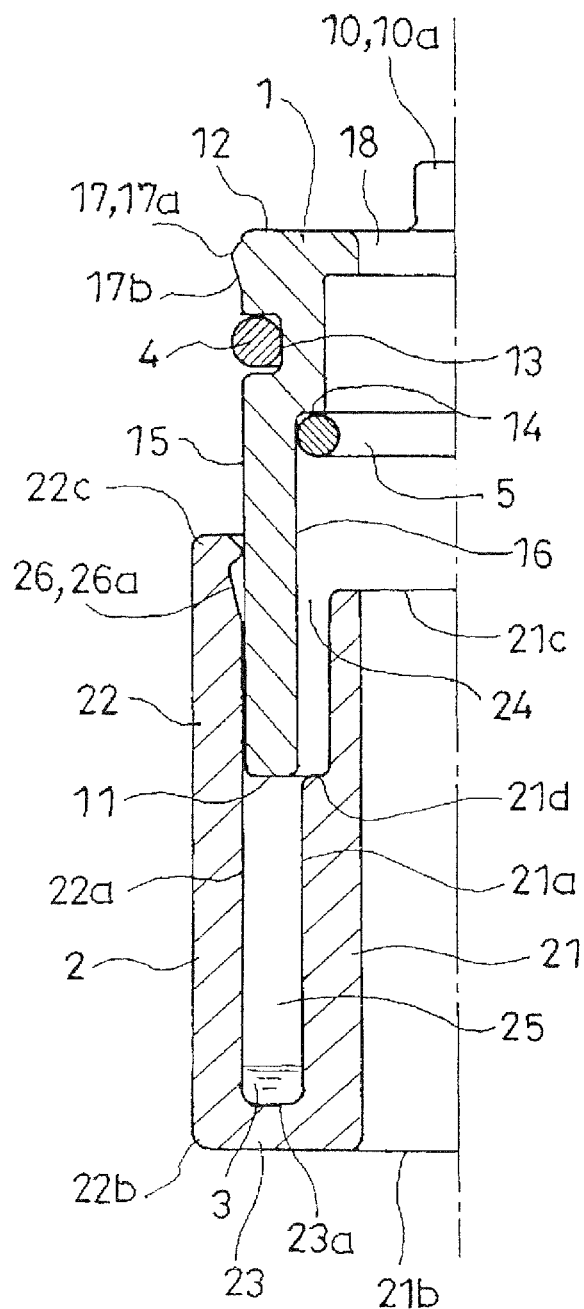
FIG. 7 is a cross-sectional structural view showing a condition in a middle when an inner part is combined with an outer part in the damper device according to the embodiment of the present invention.

Hereinafter, a typical embodiment of the present invention will be explained based on FIG. 1 to FIG. 7. A damper device according to the embodiment comprises an inner part 1; an outer part 2 allowing a rotation or a relative rotation of the inner part 1, and combined with the inner part 1; and a viscous fluid 3 providing a resistance to the rotation or the relative rotation. The damper device according to the embodiment is called, i.e., a rotary damper, a rotation damper, and the like. Such inner part 1 and outer part 2 are typically configured by a synthetic resin material.

The inner part 1 includes attachment portions 10 relative to one object which is not shown in the figures, and the outer part 2 includes an attachment portion 20 relative to the other object which is not shown in the figures, respectively. There, when the inner part 1 rotates or relatively rotates by a movement or a relative movement of one object, such damper device provides the resistance by the viscous fluid 3, and is used for operating a predetermined braking force to the movement or the relative movement of one such object.

In an illustrated example, the inner part 1 has a cylindrical shape whose both ends are open. The inner part 1 is housed into the later-mentioned annular space 25 of the outer part 2 from one cylinder end 11 side thereof. In the other cylinder end 12 of the inner part 1, there are respectively formed convex portions 10a protruding outward in a direction along a cylinder axis direction on both sides in a diametrical direction sandwiching a cylinder opening thereof. On the other hand, the outer part 2 includes an inside circular wall 21a and an outside circular wall 22a by an inner cylinder portion 21 and an outer cylinder portion 22 both having a cylindrical shape, and there is the annular space 25 therebetween. Also, in one portion of an outer surface of the outside circular wall 22a, there is included a rib 20a extending along the cylinder axis direction. In the illustrated example, in a state wherein an axis which is not shown in the figures and turnably combines one object with the other object is inserted into the inner part 1 to pass through, the inner part 1 is attached to one object by fitting the convex portions 10a in concave portions which are not shown in the figures and are formed in one object, and turns or relatively turns together with one object around the axis associated with the turning or the relative turning of one object around the axis. On the other hand, the outer part 2 is integrated with the other object side by fitting the aforementioned rib 20a in the concave portions which are not shown in the figures and are formed in the other object. Namely, in the illustrated example, the convex portions 10a of the inner part 1 function as the attachment portions 10 relative to one object, and the rib 20a of the outer part 2 functions as the attachment portion 20 relative to the other object.

The outer part 2 comprises the annular space 25 with a bottom which includes the inside circular wall 21a, the outside circular wall 22a, and a bottom wall 23a, and by the aforementioned walls 21a, 22a, and 23a, rotatably or relatively rotatably houses the inner part 1 from the one cylinder end 11 side thereof through an introduction opening 24 opposite to the bottom wall 23a side. The bottom wall 23a is formed by a bottom plate 23 ranged between one cylinder end 21b of the inner cylinder portion 21 and one cylinder end 22b of the outer cylinder portion 22. The viscous fluid 3 is filled in the annular space 25, and provides the resistance to the rotation or the relative rotation of the inner part 1 associated with the movement or the relative movement of the aforementioned one object. (The viscous fluid 3 is not shown in each figure except for FIG. 7.) As for such viscous fluid 3, typically, silicon oil or grease oil can be used. Namely, an interval slightly larger than a thickness of the inner part 1 is formed between the outside circular wall 22a and the inside circular wall 21a.

On the other hand an outer side of the inner part 1 is formed with a circular groove 13 to fit an outside seal ring 4. Also, an inner side of the inner part 1 is formed with a circular step surface 14 positioned closer to the one cylinder end 11 side than the circular groove 13, and positioning an inside seal ring 5.

In the illustrated example, the other cylinder end 12 side of the inner part 1 is formed with the circular groove 13 in such a way as to slightly open an interval with respect to the other cylinder end 12. A depth of the circular groove 13 has a dimension approximately half of the thickness of the inner part 1 at a formation portion of the circular groove 13, and is made slightly smaller than a width of the outside seal ring 4.

On the other hand, the thickness of the inner part 1 is approximately equal to the depth of the circular groove 13 from the one cylinder end 11 thereof up to a position slightly before the formation portion of the circular groove 13. Also, the thickness of the inner part 1 is approximately double of the depth of the circular groove 13 from the position slightly before the formation portion of the circular groove 13 up to the other cylinder end 12. An outer surface 15 of the inner part 1 is formed in a range from the one cylinder end 11 thereof to the other cylinder end 12 without a step. Therefore, in a position where the thickness changes, there is formed the circular step surface 14 facing the one cylinder end 11 side. An internal diameter of the inner part 1 between the circular step surface 14 and the one cylinder end 11 is approximately equal to an external diameter of the inside seal ring 5. Also, an internal diameter of the inside seal ring 5 is made slightly smaller than an external diameter on the other cylinder end 21c side of the inner cylinder portion 21 forming the inside circular wall 21a of the outer part 2.

Thereby, in the damper device according to the embodiment, when the inner part 1 is housed and combined into the annular space 25 from a state wherein the outside seal ring 4 is fitted in the circular groove 13 of the inner part 1; the inside seal ring 5 is housed inside the inner part 1; and the viscous fluid 3 is filled in the annular space 25 of the outer part 2, (FIG. 7) an air inside the annular space 25 can exit from between the outer surface 15 of the inner part 1 and the outside circular wall 22a until the inside seal ring 5 seals between an inner surface 16 of the inner part 1 and the inside circular wall 21a, and the outside seal ring 4 seals between the outer surface 15 of the inner part 1 and the outside circular wall 22a. Also, at the assembly time, a leakage to an outside of the viscous fluid 3, especially, a leakage from between the inner surface 16 of the inner part 1 and the inside circular wall 21a can be effectively prevented. Also, in a direction along a center axis x (FIG. 6) of the rotation or the relative rotation of the inner part 1, a formation position of the circular groove 13 and a formation position of the circular step surface 14 are out of alignment. Furthermore, since the depth of the circular groove 13 has the dimension approximately half of the thickness of the inner part 1 at the formation portion of the circular groove 13, an external diameter of the damper device at a seal portion between the inner part 1 and the outer part 2 can be minimized.

Also, in the embodiment, in the direction along the center axis x of the rotation or the relative rotation of the inner part 1, a distance between the circular groove 13 and the circular step surface 14 is approximately equal to widths of the outside seal ring 4 and the inside seal ring 5. Thereby, in the embodiment, a dimension of the damper device in the direction along the center axis x is also minimized.

Also, in the embodiment, the inner cylinder portion 21 forming the inside circular wall 21a of the outer part 2 has a length allowing the inside circular wall 21a to be positioned on an inward side of the circular groove 13 of the inner part 1. Namely, an external, diameter of the inner cylinder portion 21 is approximately equal to an internal diameter on the one cylinder end 11 side of the inner part 1 between the one cylinder end 21b on the bottom wall 23a side and a seal portion by the inside seal ring 5. From there, the external diameter of the inner cylinder portion 21 is approximately equal to the internal diameter on the other cylinder end 12 side of the inner part 1 and slenderizes, and there is formed a circular step surface 21d therebetween. Then, in a state wherein the inner part 1 and the outer part 2 are combined, the inside seal ring 5 is held between the circular step surface 14 of the inner part 1 and the circular step surface 21d of the outer part 2. Also, a portion between the seal portion by the inside seal ring 5 and the other cylinder end 21c of the inner cylinder portion 21 is positioned on the inward side of the circular groove 13 of the inner part 1. Thereby, in the embodiment, the inside circular wall 21a of the outer part 2 supports the inner part 1 in a wide range in the direction along the center axis x of the aforementioned rotation, so that the inner part 1 can be rotated or relatively rotated around the center axis x with little wobbling. Also, the outside seal ring 4 solidly fitted in the circular groove 13 is clamped between the inside circular wall 21a and the outside circular wall 22a so as to further stabilize a seal state by the outside seal ring 4.

Also, in the embodiment, in a position wherein the inner part 1 is completely entered in the annular space 25 of the outer part 2 on the other cylinder end 12 side of the inner part 1, there is formed an engaging portion 17 which is engaged with an engaged portion 26 formed on an introduction opening 24 side in the outside circular wall 22a of the outer part 2. Also, the inner cylinder portion 21 forming the inside circular wall 21a of the outer part 2 has a length to position the inside circular wall 21a on an inward side of the engaging portion 17 of such inner part 1. In the illustrated example, such engaging portion 17 is configured as a circular convex portion 17a formed between the circular groove 13 and the other cylinder end 12 of the inner part 1. Also, such engaged portion 26 is configured as a circular concave portion 26a formed in an inner surface on the other cylinder end 22c side of the outer cylinder portion 22 of the outer part 2. In the circular convex portion 17a, a face, which faces the one cylinder end 11 side of the inner part 1, is an inclined surface 17b spreading outward as approaching a top portion of the circular convex portion 17a. When the inner part 1 is housed into the outer part 2, the inclined surface 17b hits against the other cylinder end 22c of the outer cylinder portion 22, and mainly the other cylinder end 22c side of the outer cylinder portion 22 is elastically pushed and spread outward so as to allow the housing. Also, by an elastic return at an ending position of the housing, the circular convex portion 17a is entered into the circular concave portion 26a. Thereby, the state wherein the inner part 1 and the cuter part 2 are combined is maintained. In the inner cylinder portion 21 forming the inside circular wall 21a of the outer part 2, the inside circular wall 21a is positioned on the inward side of the engaging portion 17 of such inner part 1, so that the inner cylinder portion 21 can create a state wherein an engagement between the engaging portion 17 and the engaged portion 26 is further difficult to be solved.

Also, in the embodiment, on the other cylinder end 12 side of the inner part 1, there is formed a cylinder end of the inner cylinder portion 21 forming the inside circular wall 21a of the outer part 2 in the position wherein the inner part 1 is completely entered inside the annular space 25 of the outer part 2, i.e., an abutting portion 18 which bumps into the other cylinder end 21c. In the illustrated example, such abutting portion 18 is configured as a circular flange formed on an inner side of the other cylinder end 12 of the inner part 1. Thereby, in the embodiment, only by simply combining the inner part 1 and the outer part 2, a combined state thereof can be carried out as designed.

All contents of the specification, claims, drawings, and abstract of Japanese Patent Application No. 2011-003077 filed on Jan. 11, 2011 are cited in their entireties herein and are incorporated as a disclosure of the specification of the present invention.

What is claimed is:
1. A damper device, comprising:
an inner part having a cylindrical shape; and including a circular groove formed on an outer side thereof, a first circular step formed on a side closer to a lower end of the inner part than the circular groove on an inner side of the inner part, a circular convex portion formed between an upper end thereof and the circular groove on the outer side thereof and having first inclined surfaces protruding radially outwardly toward a top portion of the circular convex portion from the outer side of the inner part, and a first attachment portion for preventing rotation relative to one object;
an outer part including an outer cylinder portion having an outside circular wall, an inner cylinder portion arranged inside the outer cylinder portion and having an inside circular wall and a second circular step arranged on the inside circular wall to face the first circular step, a bottom wall connecting the outer circular wall and the inside circular wall, a bottomed annular space defined by the walls to rotatably or relatively rotatably house the inner part from the lower end thereof through an introduction opening opposite to the bottom wall, a circular concave portion formed on the outside circular wall to engage the circular convex portion and having second inclined surfaces inclining outwardly from an inner most end of the circular concave portion toward an inner surface of the outer circular wall, and a second attachment portion for preventing rotation relative to another object;
an inside seal ring arranged between the first circular step and the second step;
an outside seal ring fitting in the circular groove; and
a viscous fluid filled in the annular space, and providing a resistance to a rotation or a relative rotation of the inner part associated with a movement or a relative movement of the one object,
wherein
in a direction along a center axis of the rotation or the relative rotation of the inner part, a distance between the circular groove and the first circular step is approximately equal to a width of the outside seal ring or the inside seal ring, and
the inner cylinder portion has a length to position the inside circular wall inside the circular convex portion of the inner part when the inner part is completely entered into the annular space of the outer part.

2. A damper device according to claim 1, wherein the inner part includes an abutting portion at the upper end thereof, which abuts into an upper end of the inner cylinder portion when the inner part is completely entered into the annular space of the outer part.

* * * * *